United States Patent [19]

Sainen

[11] Patent Number: 5,034,897

[45] Date of Patent: Jul. 23, 1991

[54] OPTIMUM LOOM CONTROL METHOD

[75] Inventor: Tsutomu Sainen, Kanazawa, Japan

[73] Assignee: Tsudakoma Corporation, Ishikawa, Japan

[21] Appl. No.: 324,536

[22] Filed: Mar. 16, 1989

[30] Foreign Application Priority Data

Mar. 17, 1988 [JP] Japan ............................ 63-064545
Jun. 10, 1988 [JP] Japan ............................ 63-143109

[51] Int. Cl.$^5$ ............................................ G06F 15/46
[52] U.S. Cl. .................................... 364/470; 139/1 R; 364/156
[58] Field of Search .............. 364/470, 148, 172, 156, 364/900 MS File; 139/1 R, 1 D

[56] References Cited

U.S. PATENT DOCUMENTS 4,736,324  4/1988  Sainen et al. ...................... 364/470
4,835,699  5/1989  Mallard ............................. 364/470

*Primary Examiner*—Joseph Ruggiero
*Attorney, Agent, or Firm*—Wenderoth, Lind & Ponack

[57] ABSTRACT

An optimum loom control method controls a loom so that the overall profit of a weaving mill is maximized. A profit evaluation function defining a profit evaluation valve includes variables including those affecting the profit of the weaving mill, such as information on the quality of fabric woven, the number of effective picks representing the quantity of fabric produced, and the energy consumption of the loom. A controlled factor or factors corresponding to a controllable variable or variables from among those of the profit evaluation function, namely, the operating speed of the loom, the pressure of the picking fluid or both the operating speed of the loom and the pressure of the picking fluid, are controlled so that the profit evaluation value is increased to a maximum.

4 Claims, 8 Drawing Sheets

OPTIMUM LOOM CONTROL METHOD

BACKGROUND OF THE INVENTION

1. Field of the Invention

The present invention relates to an optimum control method for controlling a loom for weaving in an optimized operating state.

2. Description of the Prior Art

An optimum loom control method is disclosed in Japanese Laid-Open Patent Publication No. 61-239057 (U.S. Pat. No. 4,736,324). This known optimum loom control method gives priority to the operating rate of the loom and takes nothing into consideration for final and overall advantage. Consequently, it is possible that the control of the loom exclusively for the enhancement of the operating rate entails a reduction in overall advantage due to the deterioration of the quality of the fabric or an excessive increase in the energy consumption of the loom.

Accordingly, information on the quality of the fabric and the mode of energy consumption of the loom must be taken into consideration in addition to the operating rate for the optimum control of the loom.

In a weaving mill, the number of looms to be operated by one operator is decided on the basis of the results of analysis of the contents of work obtained by a time study or the like. In a group of looms, the operating rate of each loom is dependent on the operating rate of the rest of the looms. For example, even if the stop rate (S/cmpx) of one of the looms of a group is abnormally high, it is possible that the operating rate of the abnormal loom remains high if the rest of the looms operate at a high operating rate because the operator has sufficient time to repair the abnormal loom and is able to concentrate his effort on repairing the abnormal loom so that the abnormal loom is restarted only a short time after stoppage. On the other hand, it is also possible that the respective operating rates of the looms other than the abnormal loom are reduced due to the concentration of the repairing effort of the operator on only the abnormal loom which stops at a high stop rate (S/cmpx).

When the respective operating speeds of the loom of a group are increased uniformly to enhance the operating rate according to this known optimum loom control method, the operating speed of the abnormal loom which is in a bad operating condition and which is unsuitable for high-speed operation is increased to cause the abnormal loom to stop frequently, thereby decreasing the overall operating rate of the group of looms. Furthermore, an increase in the operating speed of the loom may increase the frequency of stoppage and may cause the deterioration of the quality of the fabric and may cause an excessive increase in energy consumption of the loom. Accordingly, information on the quality of the fabric and on the energy consumption of the loom must be taken into consideration, in addition to the operating rate of the loom, in raising the operating speed of the loom so that the loom operates at a high operating speed and at a high operating rate.

SUMMARY OF THE INVENTION

Accordingly, it is a first object of the present invention to provide an optimum loom control method capable of controlling a loom for an optimum weaving operation on the basis of sufficient information including information on the quality of the fabric on the loom and the results of the weaving operation including the energy consumption of the loom in addition to the operating rate of the loom relating to the overall profit of the weaving mill.

It is a second object of the present invention to provide an optimum loom control method capable of increasing the production rate of a loom by automatically raising the operating speed of the loom when the loom is capable of operation at a higher operating speed, provided that at least one of the operators representing the operating conditions of the loom, namely, the degree of allowance in the work of the operator, the quality of the fabric and the energy consumption of the loom, meets the corresponding reference value.

In one aspect of the present invention, an optimum loom control method employs a profit evaluation value which is a function of variables affecting the profit of a weaving mill, such as information on the quality of fabric, the effective number of picks equivalent to the quantity of fabric produced, the operating rate of the loom and the quantity of energy consumed, operates controllable variables among those variables, for example, only the operating speed of the loom, only the pressure of the picking fluid or both the operating speed and the pressure of the picking fluid, so that the profit evaluation value is maximized.

A control procedure of the optimum loom control method is carried out in a centralized control mode in accordance with a control program by a host computer or an individual control mode in accordance with a control program by the control unit of an individual loom.

A profit evaluation function is produced in the following manner.

Generally, the profit of a plant is expressed by the following expression.

Profit = Quantity sold × (Sale price − Unit cost) − Fixed cost

Controllable variables in a weaving mill are information on the quality of fabrics, such as the ratio of accepted fabrics, the operating rate of the looms (the number of effective picks per unit time) and the quantity of energy consumed, such as electric power and picking fluid.

Unaccepted fabrics are not sold. Unit profit B, namely, profit per effective pick, can be expressed by $$B = qP(S-u) - uP(1-q) = qPS - uP$$

where P is the number of effective picks, S is unit sale price, namely, sale price per pick, q is the ratio of acceptable fabrics to fabrics produced, and u is unit cost, namely, cost per pick. This expression includes only terms representing controllable variables and does not include fixed cost which cannot be controlled by production design, such as the cost of yarns, power cost and personnel expenses.

Unit time profit b, for example, profit per minute, is expressed by $$b = \eta n(qS - u)$$

where n picks/min is the operating speed of the loom, and $\eta(=P/n)$ is the operating rate of the loom.

Suppose that the unit cost u includes only material costs and energy cost, and the rest of costs are neglected for simplicity. Unit yarn cost Y, namely, yarn cost per pick, can be estimated when the design of the fabric is decided.

Suppose that the energy consumed includes electric power used for driving the loom, and energy used for compressing a picking fluid. Empirically, picking fluid consumption a, which is a function of the pressure p of the picking fluid, can be converted into power consumption by using the following expression, provided that the operating speed n and the operating rate $\eta$ are fixed.

$$e = W + Ka$$

where e is total power consumption per minute, W is unit net power consumption, namely, net power consumption per minute, and K is a coefficient of conversion.

Unit energy cost C, namely, energy cost per pick, can be expressed by $$C = (W + Ka)E/\eta n$$

where E is unit power cost (Yen/min), namely, power cost minute.

Therefore, $$u = Y + (W + Ka)E/\eta n$$

and hence $$\begin{aligned} b &= q\eta nS - \eta nY - (W + Ka)E \\ &= \eta n(qS - Y) - (W + Ka)E \\ &= P(qS - Y) - (W + Ka)E \end{aligned}$$

In the first aspect of the present invention, the operating speed n of the loom or the pressure p of the picking fluid is controlled during weaving operation so that the unit time profit b, namely, the profit evaluation value, is maximized.

The unit sale price S, the unit yarn cost Y, the coefficient K of conversion and the unit power cost E are dependent on the type of the fabric and the condition of the weaving mill, and hence those cost factors are variables to be determined empirically by the management of the weaving mill.

The unit net power consumption W and the picking fluid consumption a can readily be measured by providing the controlled loom with a watt-hour meter and a flow meter. The effective number P of picks is obtained by counting the number of rotations of the main shaft of the loom by a measuring instrument, such as a pick counter. The effective number P of picks may be replaced by the operating rate $\eta$ determined on the basis of data obtained by monitoring the operating condition of the loom.

The ratio q of accepted fabrics may be decided, similarly to the invention disclosed in Japanese Laid-Open Patent Publication No. 60-185846, on the basis of data obtained by a cloth inspecting machine connected to the loom, or on the basis of a the results of cloth inspection by a cloth inspecting machine in a cloth inspecting room or on the baisis of data entered by the operator by means of a keyboard upon the detection of defects in the fabric on the loom. The ratio q of acceptable fabrics can be directly decided from the data obtained in the cloth inspecting room. The fabrics may be graded by entering the number of defects in a control unit and comparing the number of defects with a predetermined limit number Q of defects per unit length of fabric previously stored in the control unit. In recording defects by the recording operation of the operator, a mark indicating a defect may directly be recorded or a mark indicating a defect may be determined automatically by entering the type of a defect in the control unit and determining the mark of the defect with reference to a table storing data defining marks respectively corresponding to the types of defects, stored previously in the control unit.

Basically, the foregoing profit evaluation value b is used. However, the foregoing profit evaluation function may be modified or a further generalized linear expression: $Y = \Sigma w_i \cdot x_i$ ($\Sigma w_i = 1$), where $x_i$ (i is 1 to n) are the number P of effective picks, the operating rate $\eta$ of the loom, the information on the quality of fabric (ratio q) and the unit energy cost C, and $w_i$ are weighting coefficients inherent to the weaving mill, may be used. The respective significances of those factors of the profit evaluation function can be decided properly according to the condition of the weaving mill by properly weighting the factors by the weighting coefficients. However, since the weighting coefficients $w_i$ are discrete values decided empirically, it is possible that the use of the weighting coefficients $w_i$ for the control of individual looms is not necessarily an appropriate means of optimum loom control.

It is also possible to employ those factors neglected in producing the profit evaluation function in addition to the factors of the profit evaluation function to adapt the profit evaluation function more precisely to the practical optimum loom control. One of the neglected factors is the ratio of unacceptable fabrics.

The optimum loom control method in the first aspect of the present invention controls the loom automatically on the basis of data representing the operating rate of the loom, quality of the fabric and energy consumption so that the profit evaluation value is maximized. Accordingly, the mode of operation of the loom is optimized, so that the overall profit of the weaving mill is maximized.

An optimum loom control method in the second aspect of the present invention raises the operating speed of the loom automatically to increase the production rate of the loom when the loom is capable of operating at a higher operating speed. This optimum loom control method employs at least one of the factors affecting the profit of the weaving mill, such as the frequency of stoppage of the loom per unit number of picks, which represents allowance in the work of the operator, data representing the quality of fabric, and the power consumption of the driving source of the loom, as a control parameter, and stops raising the operating speed of the loom when the parameter does not meet a condition defined by a corresponding reference value.

An actual control procedure according to the optimum loom control method is carried out individually by the control system of each loom and by a computer in a centralized control mode for individual looms. The allowance in the work of the operator is estimated from the frequency of stoppage of the looms of a group to which the operator is assigned.

Thus, the optimum loom control method raises the operating speed of the loom to the highest possible extent only when at least one of the control parameters has allowance with respect to the corresponding reference value, so that the production rate of the loom is enhanced without deteriorating any one of the control parameters.

The above and other objects, features and advantages of the present invention will become more apparent from the following description taken in conjunction with the accompanying drawings.

DESCRIPTION OF THE PREFERRED EMBODIMENT

First Embodiment

Figure 1:
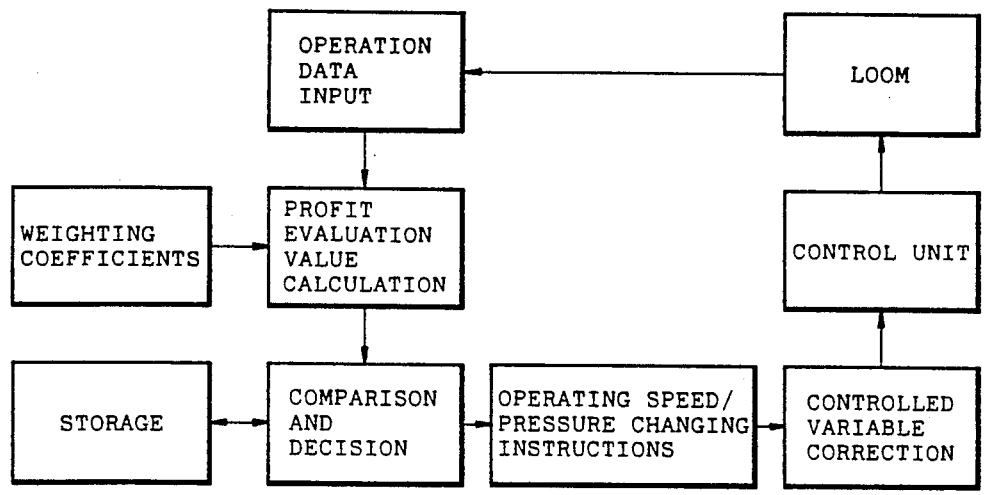
FIG. 1 is a block diagram of assistance in explaining a control procedure in an optimum loom control method in a first embodiment according to the present invention.

In starting a loom, the loom is set tentatively for a standard operating speed n and a standard pressure p of the picking fluid, which are considered to be appropriate for weaving a fabric to be woven on the loom from empirical data for various fabric specifications.

In a predetermined period of time after the start of the loom, data indicating the operating mode of the loom including the ratio q of acceptable fabric, the operating rate $\eta$ of the loom and the unit energy cost C is collected, and then the value b of the profit evaluation value is calculated by using the profit evaluation function on the basis of the collected data. Then, the operating speed and/or the pressure of the picking fluid is increased or decreased while the loom is operating so as to enhance the profit evaluation value. The operating speed n is increased or decreased by a fixed value $\Delta n$ and the pressure p is increased or decreased by a fixed value $\Delta p$ in one control cycle. Since the reliability of data obtained by measuring the operating conditions of a single loom is unsatisfactory, it is advantageous to use data obtained by processing data obtained by measuring the operating conditions of a group of a plurality looms set for weaving the same kind of fabric by a host computer for centralized control from the viewpoint of reliability of the data.

A target operating speed and a target pressure are fed through control signal lines to the control unit of each loom by the host computer, and then the control unit controls the output frequency of an inverter and drives a pressure regulating valve to adjust the operating speed of a main motor for driving the loom and a pressure regulating valve for regulating the pressure of the picking fluid to the respective target values. Although it is preferable that the picking conditions are varied automatically according to the variation of the operating speed, appropriate picking conditions may be determined through calculation by a method disclosed in Japanese Laid-Open Patent Publication No. 61-239057.

In carrying out the optimum loom control method, the profit evaluation value is calculated repeatedly. Since the tendency and dynamic characteristics of the optimum loom control operation can be estimated from the variation of the profit evaluation value with time, the mode of optimum loom control operation can be decided on the basis of the trend and characteristics of the optimum loom control operation estimated from the variation of the profit evaluation value.

During the foregoing process of optimum loom control operation, it is possible that the loom becomes unable to continue a weaving operation due to problems in the quality of the fabric when a long time is required for setting the loom for an optimum weaving condition, for example, for feeding back the results of an inspection of the fabric. In such a case, the operator may give an instruction to the computer to interrupt the evaluating operation or to restart an evaluating operation of a different mode in which an operating speed giving a maximum profit evaluation value is changed at a reduced operating speed changing step size.

For the same reason, it is advantageous from the viewpoint of avoiding an ineffective control operation to stop changing the operating speed in the same direction when the profit evaluation value b decreases beyond a lower limit or when each factor changes beyond a limit value. Such a control operation may be applied in different modes individually to the looms in view of differences in performance between the looms to enable the individual production management of each loom.

Centralized control of the looms by means of a host computer is performed in the following two modes.

(1) Calculation of the profit evaluation value b and the decision of the operating speed n and the pressure p of the picking fluid are performed by the host computer.

(2) Reference values, and variables to be decided by the management of the mill, such as yarn cost and power cost among the factors of the profit evaluation function, are given to the looms from the host computer before starting the control operation, and the actual profit evaluation cycle is executed by the microcomputer of the control unit of each loom.

Referring to FIG. 1 showing a series of steps of control procedure for controlling a loom by the optimum loom control method using the profit evaluation function, the host computer receives data representing the quality of the fabric, the operating rate of the loom and power consumption from the loom. Then, the host computer calculates the profit evaluation value b on the basis of the input data by using the profit evaluation function properly weighting the factors of the profit evaluation function. Then, the calculated profit evaluation value b is compared with a reference profit evaluation value previously stored in the host computer. Then, control data is fed to the control unit of the loom to change only the operating speed n of the loom, only the pressure p of the picking fluid, or both the operating speed n and the pressure p in order to maximize the profit evaluation value b. Then, other controlled variables, such as picking fluid jetting timing and warp tension, are adjusted accordingly. Thereafter, the control unit controls the loom on the basis of the control data for optimum loom control.

Figure 2:
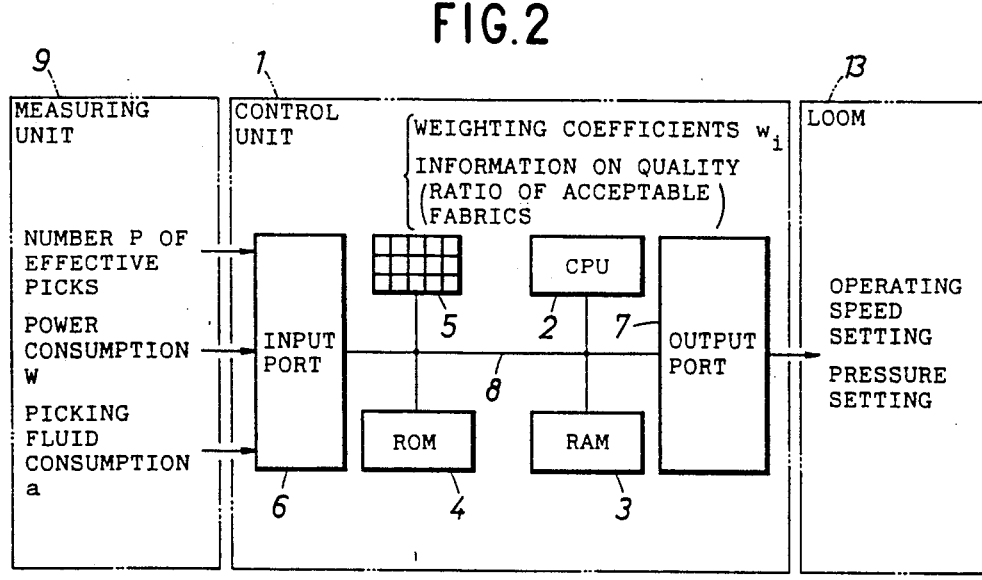
FIG. 2 is a block diagram of a loom control apparatus for executing the optimum loom control method of FIG. 1.

FIG. 2 shows an individual optimum control system for executing the optimum loom control method by the control unit 1 of an individual loom.

The control unit 1 of the loom comprises a CPU (central processing unit) 2, a RAM (random access memory) 3, a ROM (read-only memory) 4, a keyboard 5, an input port 6 and an output port 7, which are interconnected by a bus 8. The CPU 2 receives data representing the number P of effective picks, the unit power consumption W and the picking fluid consumption a through the input port 6 from a measuring unit 9 (FIGS. 4 and 5), and processes the data to obtain a profit evaluation value b. Then, the CPU 2 feeds control signals to an associated loom 13 according to the control procedure of FIG. 1 to set the loom 13 for an operating speed n and a pressure p for optimum control.

Figure 3:
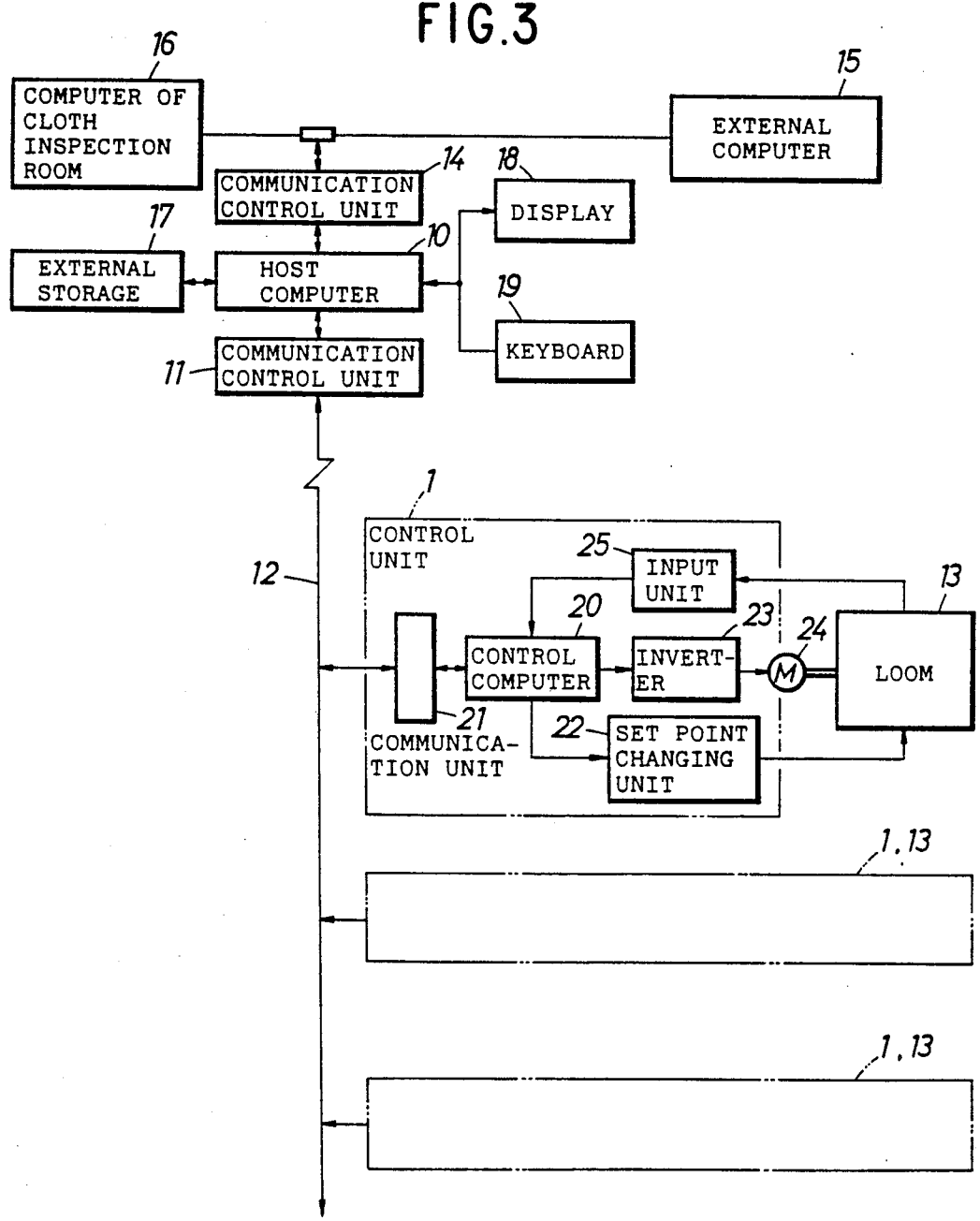
FIG. 3 is a block diagram of a centralized control system for carrying out the optimum loom control method of FIG. 1.

FIG. 3 shows a centralized optimum control system for controlling a plurality of looms by a host computer 10.

The host computer 10 is connected through a communication control unit 11 and a signal line 12 to a group of looms 13 for weaving the same fabrics, through a communication control unit 14 to an external computer 15 and a cloth inspection computer 16, and to an external storage unit 17, a display 18 and a keyboard 19. The host computer 10 receives data representing operating conditions of the looms 13, calculates a profit evaluation value b, when necessary, by weighting the data by the weighting coefficients $w_i$, compares the profit evaluation value b with a corresponding data previously stored in the external storage unit 17 to decide the course of optimum control operation, and feeds control signals through the communication control unit 11 and the signal line 12 to the looms 13. When necessary, the profit evaluation value b, the weighting coefficients $w_i$ and the data retrieved from the external storage unit 17 are displayed on the display 18.

The control unit 1 of the individual loom 13 comprises a control computer 20, a communication unit 21, a set point changing unit 22, an inverter 23 and an input unit 25. The control computer 20 receives data representing the operating speed n and the pressure p of the picking fluid through the communication unit 21, drives the set point changing unit 22 to adjust the operating conditions of the loom 13 including the pressure p of the picking fluid, changes the output frequency of the inverter 23 to change the operating speed n of the main motor 24 of the loom 13. While the loom 13 is in a weaving operation, the control computer 20 receives data representing the operating conditions of the loom 13 through the input unit 25, and sends the data through the communication unit 21 to the host computer 10. Then, the host computer 10 calculates a profit evaluation value b again, decides the course of optimum control, decides values of the operating speed n of the loom 13 and the pressure p of the picking fluid so that the profit evaluation value approaches an optimum value, and feeds control signals representing new set points of the operating speed n and the pressure p of the picking fluid to the control unit 1 of the loom 13. Thus, the host computer 10 calculates the profit evaluation value b several times and the control unit 1 of the loom 13 changes the set point of the operating speed n and the pressure p of the picking fluid according to control singals given thereto from the host computer 10 to decide final control conditions maximizing the profit evaluation value b.

Figure 4:
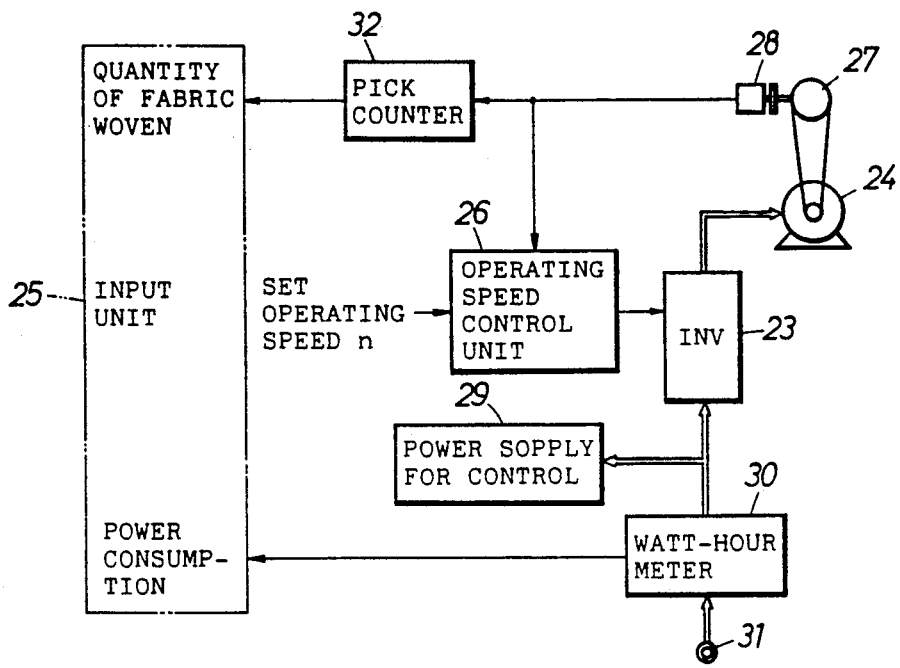
FIG. 4 is a block diagram of an operating speed control device for controlling the operating speed of the loom in accordance with the optimum loom control method of FIG. 1.

FIG. 4 shows a system for obtaining data representing the number P of effective picks representing the length of fabric woven on the loom 13, and the total power consumption e per minute. A control signal indicating the operating speed n is supplied to the operating speed control unit 26 of the inverter 23. A power source 31 is connected through a watt-hour meter 30 to the inverter 23 and a control power supply 29. Data representing the total power consumption e per minute measured by the watt-hour meter 30 is fed through the input unit 25 to the control computer 20 of the control unit 1. The rotating speed of the main motor 24 is detected by an encoder 28 associated with the main shaft 27 of the loom 13, and then the output signal of the encoder 28 is fed back to the operating speed control unit 26. A pick counter 32 counts the output signal of the encoder 28 and feeds data representing the length of fabric woven to the input unit 25.

Figure 5:
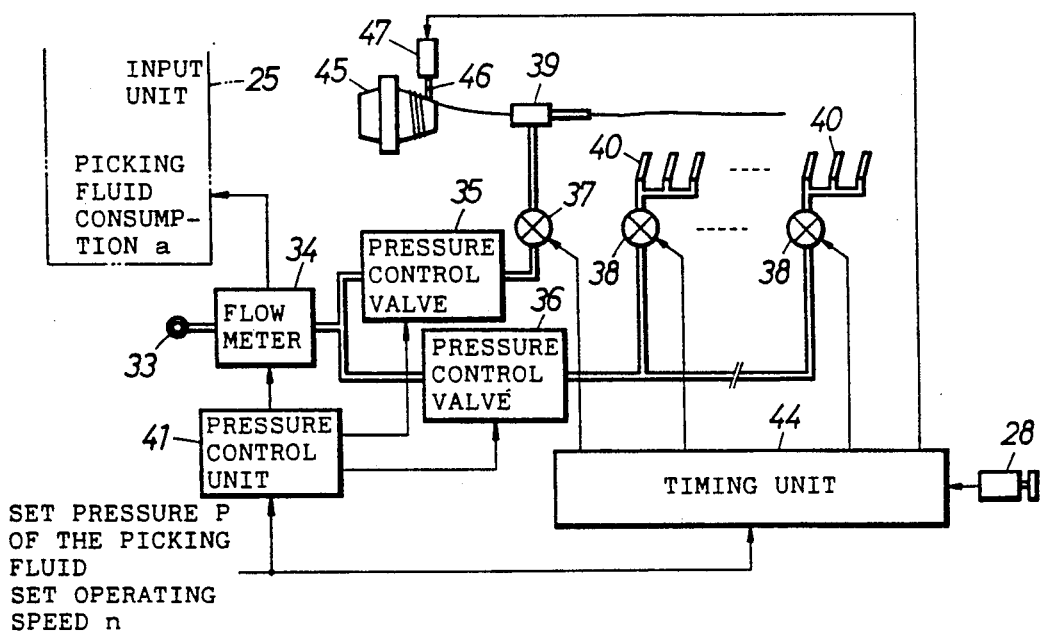
FIG. 5 is a block diagram of a pressure control device for controlling the pressure of the picking fluid in accordance with the optimum loom control method of FIG. 1.

FIG. 5 shows a system for measuring the picking fluid consumption a; a picking fluid discharged from a picking fluid source 33 is supplied through a flow meter 34, a pressure regulating control valve 35 and a solenoid valve 37 to a main pickling nozzle 39, and through a pressure regulating control valve 36 and solenoid valves 38 to auxiliary picking nozzles 40. The picking fluid consumption a is measured by the flow meter 34. A control signal representing a target pressure of the picking fluid is fed to a pressure control unit 41, which in turn controls the pressure regulating control valves 35 and 36 to adjust the pressure of the picking fluid to the target pressure. Since the change of the operating speed n of the loom entails a change in the picking starting phase, a timing control unit 44 corrects the picking starting phase and controls the operation of the solenoid valves 37 and 38, and also controls a plunger 47 for driving the retaining pin 46 of a weft measuring and storing device 45 with reference to the output signal of the encoder 28 indicating the phase (crank angle) of the main shaft 27 of the loom.

Figure 6:
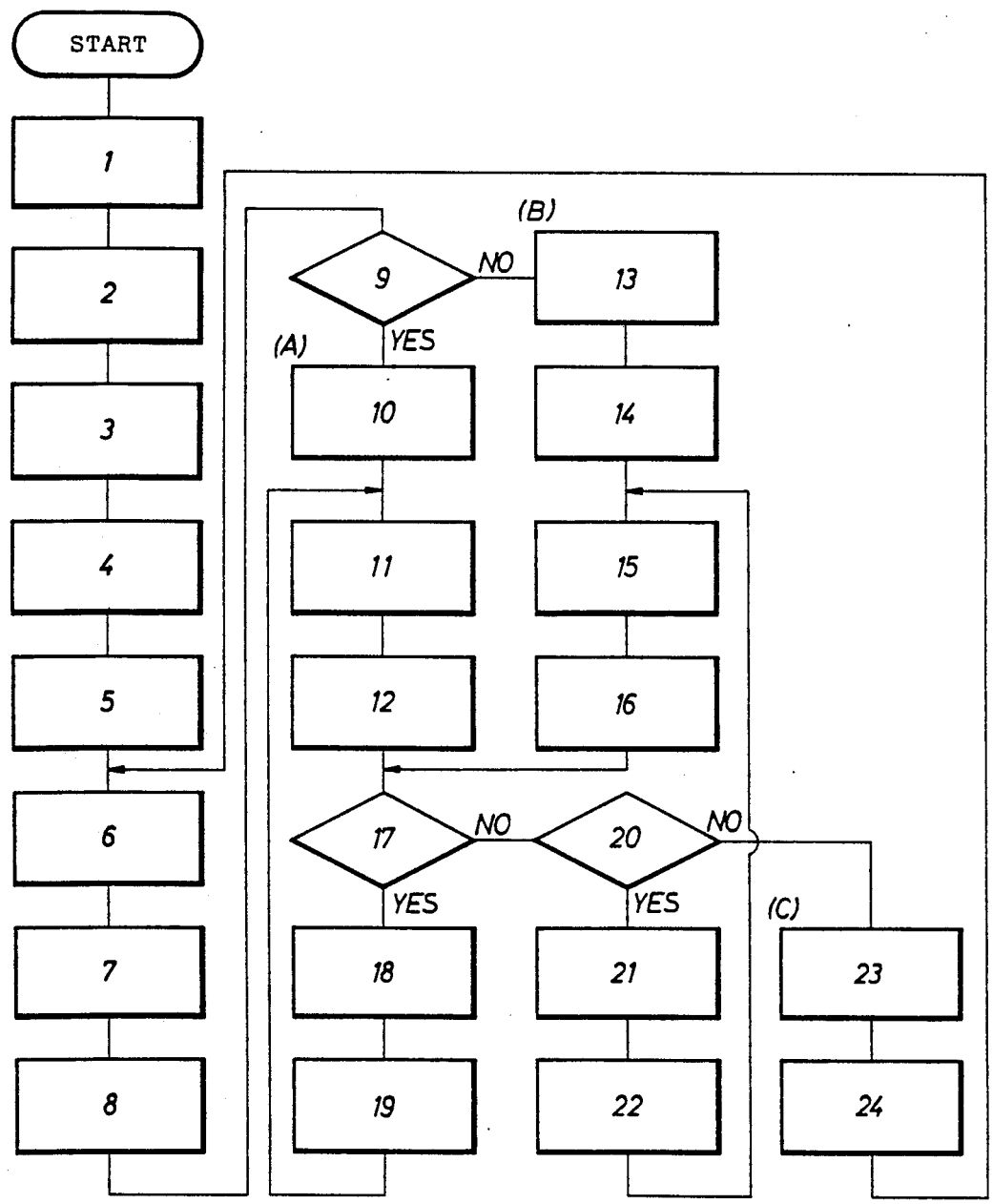
FIG. 6 is a flowchart, showing steps of optimum loom control procedure in accordance with the optimum loom control method of FIG. 1.

A procedure for controlling the operating speed of the loom will be described hereinafter with reference to FIG. 6.

In steps 1 through 5, the host computer 10 or the control unit 1 of the loom reads weighting coefficients $w_i$, sets an operating speed adjusting step size $\Delta N$ and a target operating speed $n_1 = N$, collects data representing the operating condition of the loom, and calculates a first profit evaluation value $b_1$.

In steps 6 through 8, the host computer 10 or the control unit 1 sets a new target operating speed $n_2 = N + \Delta N$, collects data representing the results of the control, and calculates a second profit evaluation value $b_2$.

Figure 7A:
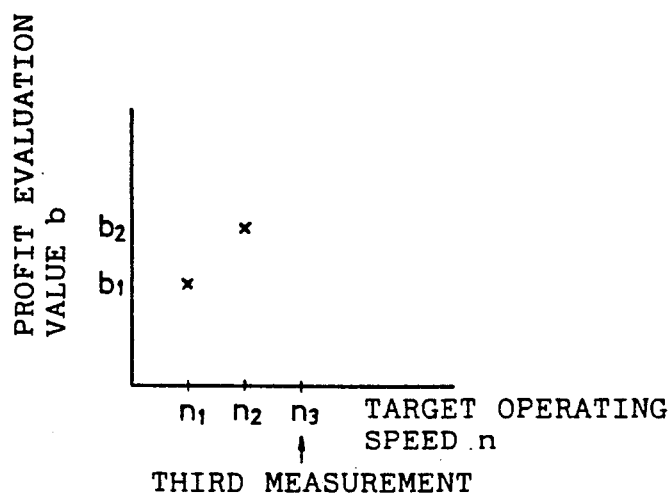
FIGS. 7(A), 7(B) and 7(C) are graphs of assistance in explaining the variation of a profit evaluation value with the operating speed of the loom for the pressure of the picking fluid.
Figure 7B:
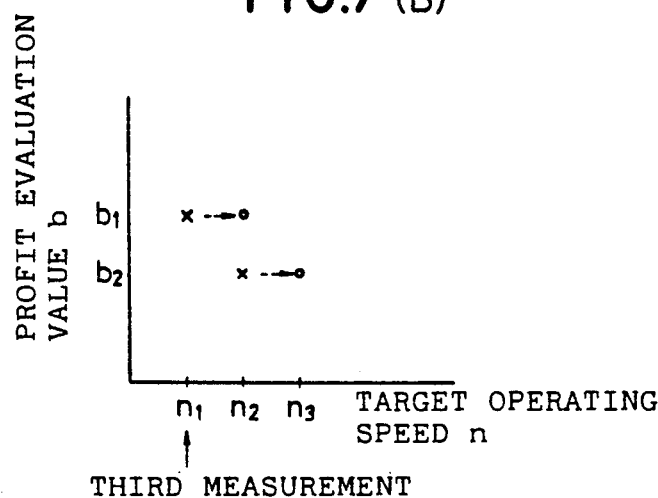
Figure 7C:
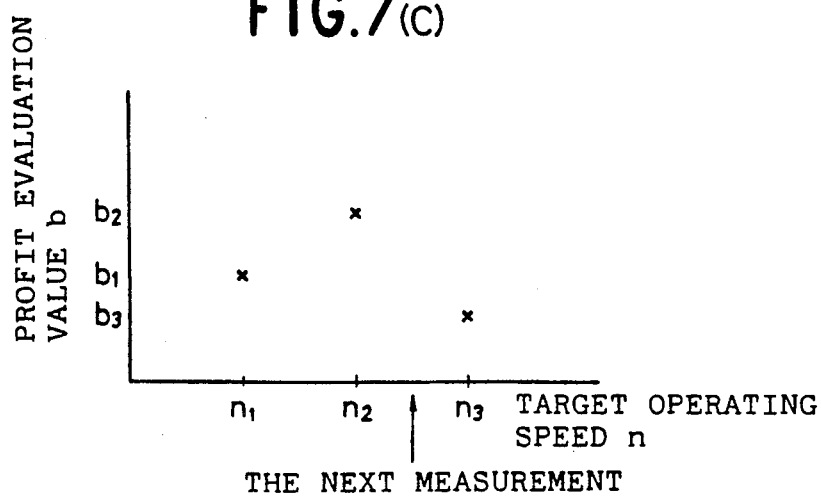

In step 9, the profit evaluation values $b_1$ and $b_2$ are compared, and then the control routine is branched in accordance with the result of the comparison. When the second profit evaluation value $b_2$ is equal to or greater than the first profit evaluation value $b_1$, namely, when the loom is controlled in a state as shown in FIG. 7(A), a new target operating speed $n_3 = N + 2\Delta N$ is set, data representing the operating condition of the loom is collected, and then a third profit evaluation value $b_3$ is calculated in steps 10 through 12. When the second profit evaluation value $b_2$ is less than the first profit evaluation value $b_1$, namely, when the loom is controlled in a state as shown in FIG. 7(B), $b_3 = b_2$, $b_2 = b_1$, $n_3 = n_2$ and $n_2 = n_1$ are set again, a target operating speed $n_1 = N - \Delta N$ is set, data representing the results of the control is collected, and then a third profit evaluation value $b_3$ is calculated in steps 13 through 16.

After thus calculating the profit evaluation values $b_1$, $b_2$ and $b_3$ for the three target operating speeds $n_1$, $n_2$ and $n_3$, a determination is made in step 17 as is whether or not the profit evaluation value varies along a monotonically increasing curve or a curve having a minimum. When the decision in step 17 is affirmative, $b_1 = b_2$, $b_2 = b_3$, $n_1 = n_2$, and $n_2 = n_3$ are set in step 18, and then a target operating speed $n_3 = n_3 + \Delta N$ is set in step 19.

When the decision in step 17 is negative, a determination is made in step 20 as to whether or not the profit evaluation value varies along a monotonically decreasing curve. When the decision in step 20 is affirmative, $b_3 = b_2$, $b_2 = b_1$ $n_3 = n_2$ and $n_2 = n_1$ are set, and then a target operating speed $n_1 = n_1 - \Delta N$ is set.

When the decision in step 20 is negative, namely when the profit evaluation value varies along a curve having a maximum, $b_1 = b_2$ and $n_1 = n_2$ are set, the operating speed adjusting step size $\Delta N$ is changed for an operating speed adjusting step size $\Delta N/2$ in step 24, and then the routine returns to step 6. Then, steps 6 through 24 are repeated again.

The host computer 10 or the control unit 1 repeats the foregoing control program to decide a target operating speed n for the individual loom 13 in accordance with the operating characteristics of the same loom 13, and controls the controllable variables to maximize the profit evaluation value so that an optimum operating condition of the loom 13 is established.

Although the optimum loom control method in the first embodiment has been described as applied to controlling only the operating speed n, the optimum loom control method is applicable also to controlling both the operating speed n and the pressure p of the picking fluid.

Figure 8:
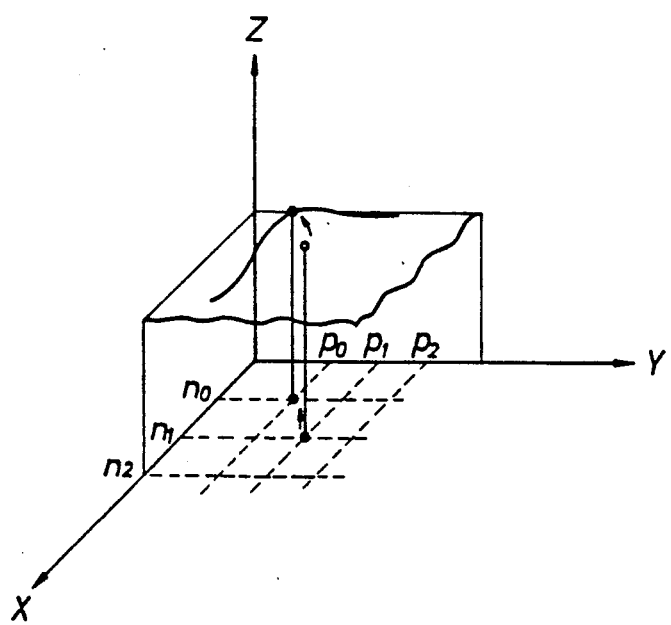
FIG. 8 is a graph showing a model of optimum controlled state.

FIG. 8 is a graph of assistance in explaining a procedure for controlling both the operating speed n and the pressure p of the picking fluid by the optimum loom control method in the first embodiment. In FIG. 8, the operating speed n and the pressure p are measured on axes X and Y, respectively, and the profit evaluation value b is measured on a vertical axis Z. First a tentative operating speed and a tentative pressure p are set, and then a maximum is searched for at a rotating speed adjusting step size $\Delta N$ and a pressure adjusting step size $\Delta P$ by a hill climbing method or a steepset descent method. Three operating speeds and three pressures, in combination, provide nine profit evaluation values, among which the maximum profit evaluation value is found.

| Operating speed | Pressure | | |
|---|---|---|---|
| | $P_0 (p - \Delta P)$ | $p_1 (p)$ | $p_2 (p + \Delta P)$ |
| $n_0 (n - \Delta N)$ | $b_{00}$ | $b_{01}$ | $b_{02}$ |
| $n_1 (n)$ | $b_{10}$ | $b_{11}$ | $b_{12}$ |

-continued

| Operating speed | Pressure | | |
|---|---|---|---|
| | $P_0 (p - \Delta P)$ | $p_1 (p)$ | $p_2 (p + \Delta P)$ |
| $n_2 (n + \Delta N)$ | $b_{20}$ | $b_{21}$ | $b_{22}$ |

Note: $b_{11}$ is a tentative pressure.

In FIG. 8, the maximum profit evaluation value is $b_{00}$. The maximum profit evaluation value can be decided more rapidly by varying the operating speed adjusting step size $\Delta N$ in proportion to the gradation of a curve on which the profit evaluation values $b_1$, $b_2$ and $b_3$ are plotted.

The optimum loom control method may be executed in the following two modes for controlling both the operating speed n and the pressure p of the picking fluid.

MODE 1

Step 1

The operating speed n is controlled to maximize the profit evaluation value b.

Step 2

The pressure p is controlled to further maximize the profit evaluation value b under an operating speed at which the profit evaluation value reached the maximum in step 1.

MODE 2

Step 1

A tentative operating speed n is increased by the operating speed adjusting step size $\Delta N$ to an operating speed $n_1$.

Step 2

The pressure p is controlled under the operating speed $n_1$ so as to obtain a maximum profit evaluation value $b_1$.

Step 3

The operating speed $n_1$ is increased by the operating speed adjusting step size $\Delta N$ to $n_1 + \Delta N$.

Step 4 the pressure p is controlled under the operating speed $n_1 + \Delta N$ to obtain a maximum profit evaluation value $b_2$.

Step 5

When $b_1 < b_2$, the operating speed is increased further by the operating speed adjusting step size N to $n_1 + 2\Delta N$. When $b_1 > b_2$, the operating speed is reduced by the operating speed adjusting step size $\Delta N$ to n (tentative operating speed)—$\Delta N$, i.e., $n_2$.

Step 6

The pressure p is controlled under the operating speed $n_2$ to obtain a maximum profit evaluation value $b_3$.

Step 7

The operating speed $n_2$ is changed with reference to a curve on which the profit evaluation values $b_1$, $b_2$ and $b_3$ are plotted so that the profit evaluation value is further increased. Subsequently, a control operation similar to that shown in FIG. 6 is executed to set the loom for an optimum operating condition.

SECOND EMBODIMENT

Figure 9:
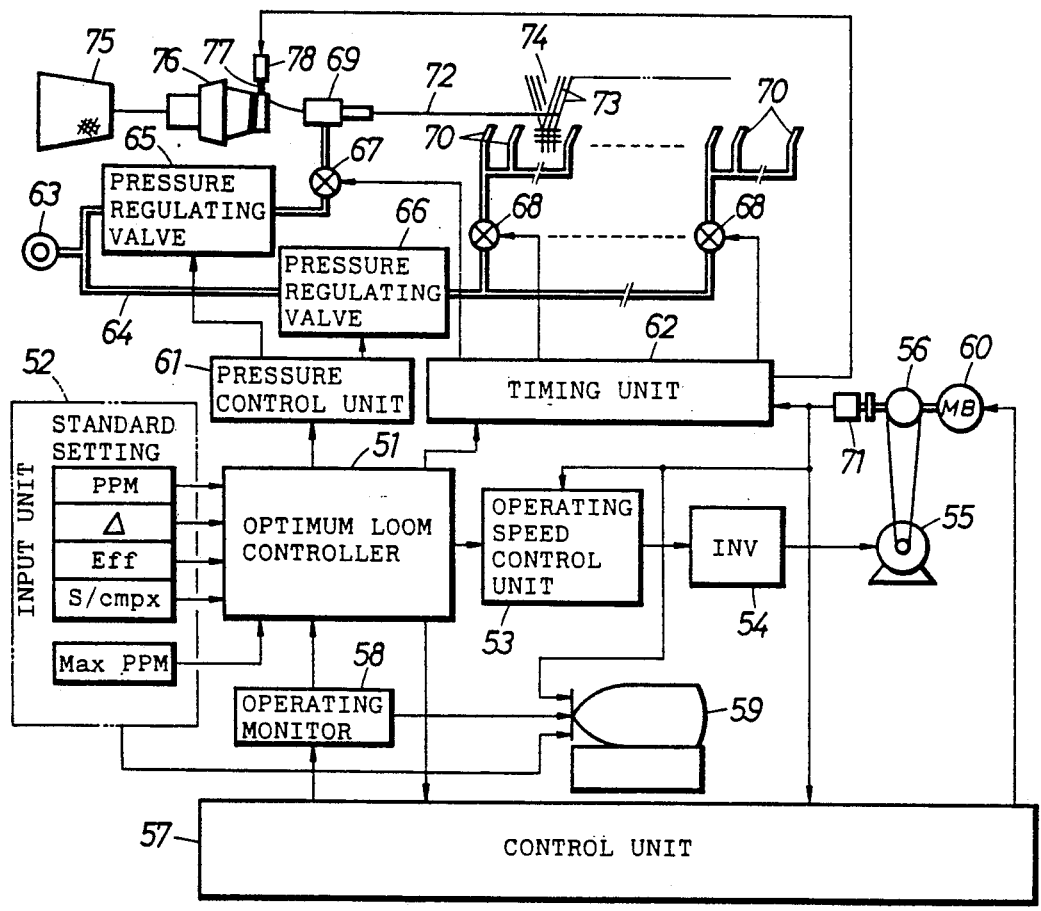
FIG. 9 is a block diagram of a control system for carrying out the optimum loom control method of FIG. 1.

Referring to FIG. 9 showing the control system of a loom, an optimum loom control method is carried out by an optimum loom controller 51 included in the control system. The input of the optimum loom controller 51 is connected to a standard data input unit 52, and the output of the optimum loom controller 51 is connected to an operating speed control unit 53, which in turn is connected through an inverter 54 to a main motor 55 for driving the loom. The main motor 55 drives the main shaft 56 of the loom for a weaving operation.

The optimum loom controller 51 is connected to the control unit 57 of the loom. The control unit 57 executes a sequential control operation for controlling the let-off motion, takeup motion, starting, stopping and automatic repairing motion of the loom. The control unit 57 is connected through an operation monitor 58 to the optimum loom controller 51 and a display monitor 59. The display monitor 59 is connected to the standard data input unit 52 to display standards set by the standard data input unit 52. An electromagnetic brake 60 for braking the main shaft 56 of the loom is controlled by the control unit 57.

The output of the optimum loom controller 51 is also connected to a pressure control unit 61 and a timing unit 62 for controlling a picking motion. The pressure control unit 61 controls pressure regulating control valves 65 and 66 provided in a line 64 connected to a picking fluid source 63 to supply a picking fluid of a pressure necessary for picking to a main picking nozzle 69 through an on-off valve 67 and to a plurality of auxiliary picking nozzles 70 through a plurality of on-off valves 68. The timing unit 62 detects the phase of the main shaft 56 from the output signal of a phase detector 71 associated with the main shaft 56, and opens the on-off valves 67 and 68 respectively at phases set by the optimum loom controller 51 to jet the picking fluid from the main picking nozzle 69 and the auxiliary picking nozzles 70 for picking a weft yarn 72 into the shed 74 of warp yarns 73. The weft yarn 72 unwound from a yarn package 75 is stored on and retained by a retaining pin 77 on a weft yarn measuring and storing device 76 of a drum type. The retaining pin 77 is driven by a solenoid 78, which in turn is controlled by the timing unit 62.

The phase detector 71 is connected to the timing unit 62, the operating speed control unit 53 and the control unit 57. Incidentally, the optimum loom controller 51 and the control unit 57 of the loom may be individual computers or a sequential controller, or may be combined in a single common control computer.

The operation of the optimum loom controller 51 for carrying out the optimum loom control method in the second embodiment will be described hereinafter.

Prior to starting the loom, standards STDs of picking rate PPM, i.e., number of picks per minute equivalent to the operating speed n (rpm) of the loom, picking rate adjusting step size Δ, operating rate Eff, and stop rate S/cmpx, namely, the frequency of stoppage of the loom per 100,000 picks are set by operating the standard data input unit 52. Data representing a maximum picking rate Max PPM equivalent to an allowable maximum operating speed of the loom is fed to the optimum loom controller 51 and, if necessary, the input data is displayed on the display monitor 59.

Figure 10:
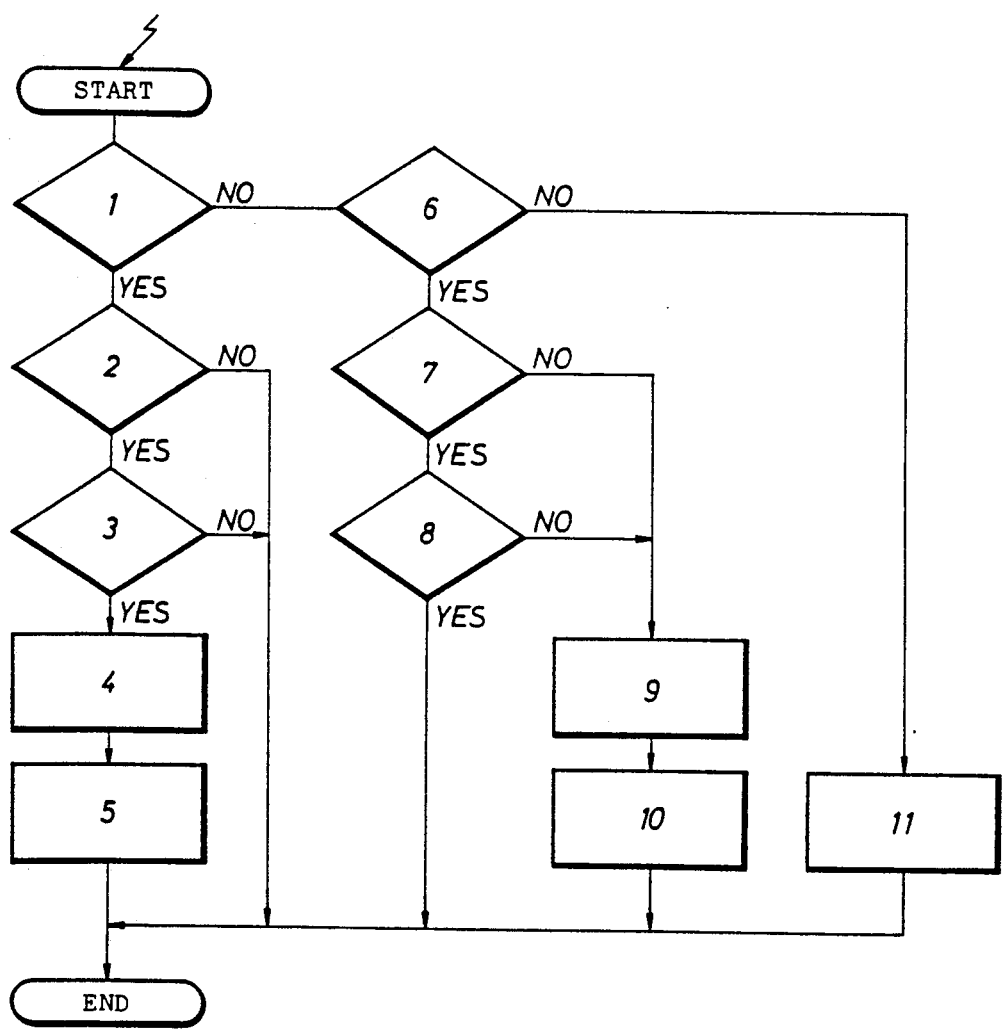
FIG. 10 is a flowchar, of assistance in explaining an optimum operating speed control mode in accordance with an optimum loom control method in a second embodiment according to the present invention.

Upon the reception of an instruction from the operator, the control unit 57 of the loom actuates the optimum loom controller 51, and then the optimum loom controller 51 drives the inverter 54 to make the main motor 55 drive the loom at an initial operating speed. Meantime, the control unit 57 feeds signals representing picking rate PPM and stop rate S/cmpx to the optimum loom controller 51 and the operation monitor 58 and displays the signals on the display monitor 59, processes the signals to obtain an operating rate Eff and to feed the operating rate Eff to the optimum loom controller 51. The optimum loom controller 51 executes a control program shown in FIG. 10 periodically or once every predetermined number of picks. In step 1 of the control program, the present operating rate Eff is compared with a standard operating rate STD Eff. When the present operating rate Eff is greater than the standard operating rate STD Eff, the present stop rate S/cmpx is compared with a standard stop rate STD S/cmpx in step 2. The standard stop rate STD S/cmpx is decided with reference to the working ability of the operator. When the present stop rate S/cmpx is smaller than the standard stop rate STD S/cmpx, and the present picking rate PPM is found to be smaller than the maximum picking rate Max PPM (in step 3), then, in step 4, the picking rate adjusting step size Δ is added to the present picking rate PPM to set a new picking rate PPM. In step 5, the operating speed control unit 53 changes the operating speed of the main motor 55 to drive the loom at an operating speed n corresponding to the new picking rate PPM. Thus, the operating speed n of the loom is increased automatically when there is margin in the respective abilities of the loom and the operator.

When a decision made in step 2 is negative, namely, when the present stop rate S/cmpx is greater than the standard stop rate STD S/cmpx and further increase in picking rate PPM will make the operator unable to attend properly all the looms of the group entailing further increase in the stop rate S/cmpx, the optimum loom controller 51 interrupts raising the operating speed n of the loom and ends the control program.

In interrupting the control of the loom, the present picking rate PPM may be reduced by the picking rate adjusting step size Δ instead of maintaining the present picking rate PPM.

Also when a decision made in step 3 is negative, the optimum loom controller 51 interrupts raising the operating speed n of the loom and ends the control program.

When a decision made in step 1 is negative, the program goes to step 6. A decision is made as to whether or not the present picking rate PPM is greater than the standard picking rate STD PPM in step 6; a decision is made as to whether or not the present stop rate S/cmpx is not greater than the standard stop rate STD S/cmpx is Step 7 and a decision is made as to whether or not the present total number of picks PK representing the quantity of fabric produced is greater than a standard picks STD PK in step 8. When the decisions in steps 6, 7 and 8 are affirmative, the control program is ended. When the decision in step 7 is negative or when the decision in step 8 is negative, the present picking rate PPM is reduced in steps 9 and 10, and then the control program is ended. If the decision in step 6 is negative, the optimum loom controller 51 decides that the loom is in an abnormal operating state. Then, an alarm signal is fed to the control unit 57 of the loom in step 11 and, if necessary, displays the alarm signal on the display monitor 59. The standard picking rate STD PK is defined by STD PK = STD Eff × Total time of operation × STD PPM Simultaneously with the change of the present picking rate PPM in step 5 or 10, instructions are fed to the pressure control unit 61 to change the pressure of the picking fluid jetted by the main picking nozzle 69 and the auxiliary nozzles 70, and to the timing unit 62 to change the respective operating phases of the main picking nozzle 69 and the auxiliary picking nozzles 70, and to the control unit 57 to change warp tension and stopping crank angle.

The total number of stoppages may be used instead of the stopping rate S/cmpx. When the loom is equipped with an automatic faulty pick correcting device, the loom is restarted automatically after stoppages due to faulty picking, and hence the stoppage of the loom attributable to faulty picking is not a load on the operator. Accordingly, the number of stoppage attributable to faulty picking is excluded from the effective number of stoppage for control.

Although the stop rate is employed in the optimum loom control method of the present invention as a parameter for the control operation, the parameter may be at least either information on the quality of the fabric woven or the energy consumption of the main motor 55, or a selective combination of those parameters.

The ratio of acceptable fabric is available as information on the quality of fabric woven. The ratio of acceptable fabric may be data obtained by a cloth inspecting device incorporated into the loom, or by data obtained by a cloth inspecting machine of a cloth inspecting room, or by data of defects found by the operator and entered by the operator by operating a keyboard. Fabrics may be graded with reference to a predetermined quality limit, such as a limit mark of defects in a fabric of a fixed length. Data representing a defect entered by the operator may be either the mark of the defect or the kind of the defect. When the kind of defect is entered, the kind is converted automatically into a mark by using a table previously stored in the optimum loom controller.

Although the invention has been described in its preferred form with a certain degree of particularity, it is to be understood that many variations and changes are possible in the invention without departing from the scope thereof.

What is claimed is:

1. An optimum loom control method comprising organizing a profit evaluation function of variables affecting the profit of a weaving mill, including information on the quality of fabric woven, production rate and energy consumption; and controlling an operating parameter of an individual loom corresponding to a controllable variable from among the variables defining the profit evaluating function so that the profit evaluation value defined by the profit evaluation function is maximized.

2. An optimum loom control method according to claim 1, wherein said controlled operating parameter is at least one of the operating speed of the loom and the pressure of the picking fluid.

3. An optimum loom control method according to claim 1, wherein the information on the quality of fabric woven, the production rate and the energy consumption comprising the profit evaluation function are weighted.

4. An optimum loom control method according to claim 2, wherein the information on the quality of fabric woven, the production rate and the energy consumption comprising the profit evaluation function are weighted.

* * * * *